Figure 1:
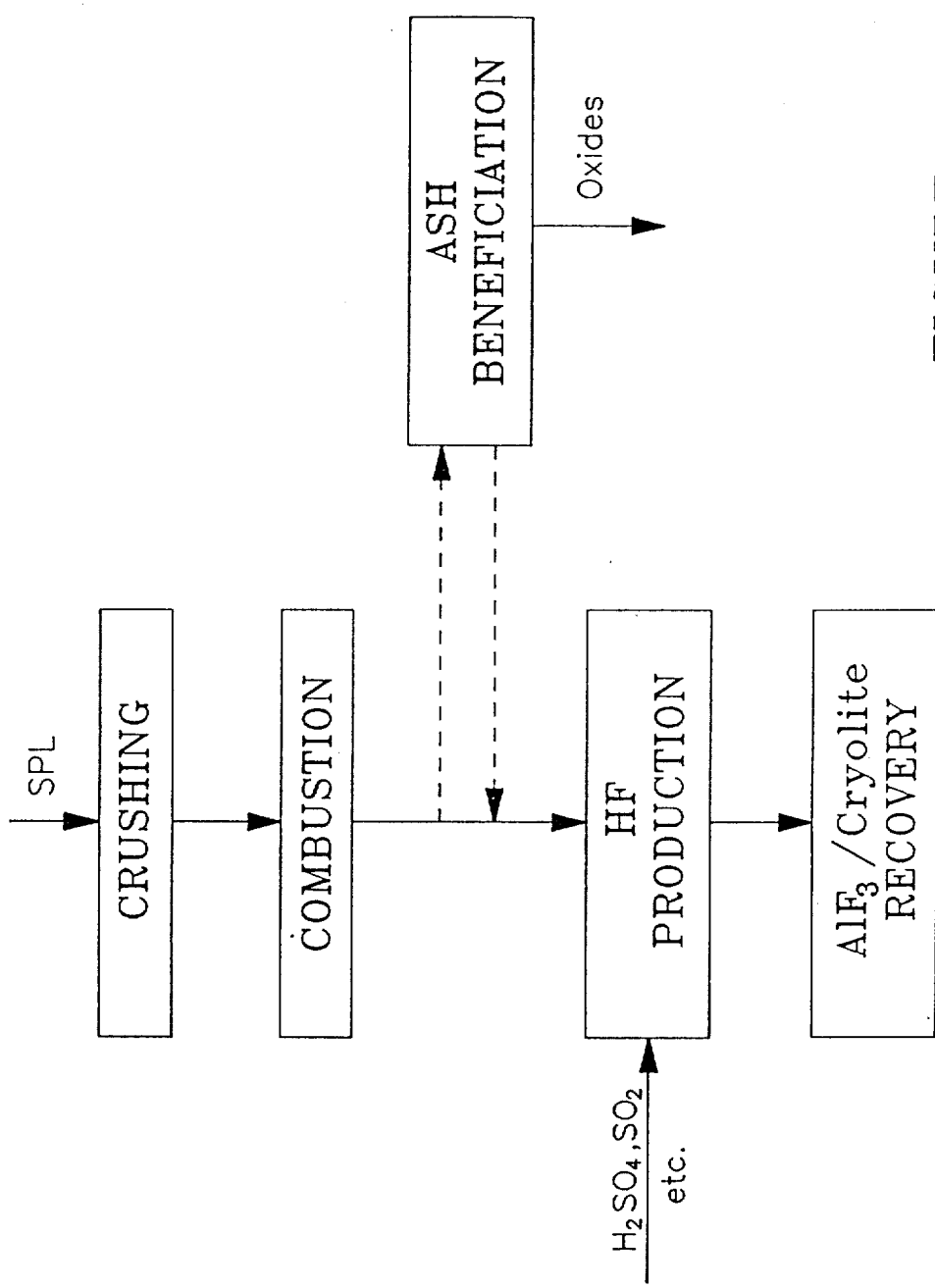

United States Patent [19]

Goodes et al.

[11] Patent Number: 4,900,535
[45] Date of Patent: Feb. 13, 1990

[54] RECOVERY OF FLUORIDE VALUES FROM WASTE MATERIALS

[75] Inventors: Christopher G. Goodes; Grant A. Wellwood, both of Mill Park, Australia; Howard W. Hayden, Jr., Oak Ridge, Tenn.

[73] Assignee: Comalco Aluminum Limited, Melbourne, Australia

[21] Appl. No.: 121,956

[22] Filed: Nov. 18, 1987

[30] Foreign Application Priority Data

Dec. 22, 1986 [AU] Australia .................... PH 9614

[51] Int. Cl.⁴ .................... C01B 7/19; C01B 17/96
[52] U.S. Cl. .................... 423/484; 423/128; 423/166; 423/193
[58] Field of Search ........... 423/484, 489, 116, 128, 423/166, 193

[56] References Cited

U.S. PATENT DOCUMENTS

| | | | |
|---|---|---|---|
| 4,065,551 | 12/1977 | Dahl | 423/484 |
| 4,113,832 | 9/1978 | Bell et al. | 423/484 |
| 4,158,701 | 6/1979 | Andersen et al. | 423/484 |
| 4,160,809 | 7/1979 | Anderson et al. | 423/484 |
| 4,355,017 | 10/1982 | Gamson et al. | 423/484 |
| 4,444,740 | 4/1984 | Snodgrass et al. | 423/484 |

FOREIGN PATENT DOCUMENTS 61-36103  2/1986  Japan ........................ 423/484

*Primary Examiner*—Jeffrey E. Russel
*Attorney, Agent, or Firm*—Roylance, Abrams, Berdo & Goodman

[57] ABSTRACT

A process for the treatment of waste materials such as spent cathode liners involving combustion of the contained carbonaceous material, decomposition of the contained cyanides, sulphides and nitrides, and recovery of fluoride values by a sulpholysis reaction, is characterized in that the sulpholysis reaction is carried out in a separate stage. The process enables a recovery of fluoride values from smelter wastes which is especially favourable environmentally. A further advantage of the invention is that recovery of the contained fluoride values, initially in the form of gaseous fluoride species, may subsequently be treated with alumina to produce aluminium trifluoride, which is of significant economic importance.

15 Claims, 2 Drawing Sheets

RECOVERY OF FLUORIDE VALUES FROM WASTE MATERIALS

This invention relates to a process for recovering fluoride values from waste materials.

The process of the invention is of particular value in the treatment of waste materials from the electrolytic smelting of aluminium, for example spent cathode liners.

In a principal aspect the invention provides a process for the treatment of waste materials such as spent cathode liners involving combustion of the contained carbonaceous material, decomposition of the contained cyanides, sulphides and nitrides, and the recovery of fluoride values by a sulpholysis reaction, characterized in that the sulpholysis reaction is carried out in a separate stage.

The process enables a recovery of fluoride values from smelter wastes which is especially favourable environmentally. Such wastes are frequently dumped on land filled sites so giving rise to potentially considerable environmental damage resulting from leaching, not only of the contained fluorides, but also of cyanides, both of which are highly toxic. A further advantage of the invention is that recovery of the contained fluoride values, initially in the form of gaseous fluoride species, may subsequently be treated with alumina to produce aluminium trifluoride, an essential chemical used in aluminium smelting to maintain the required chemical composition of the fused salt baths used. The production of said trifluoride is of significant economic importance.

Several methods in the prior art have been proposed for recovering cryolite from spent cathode materials which have included extraction by sodium hydroxide, sodium carbonate, or water. U.S. Pats. No. 1,871,723 and 2,732,283 teach the treatment of carbon cell lining material with aqueous caustic solutions to yield sodium fluoride and sodium aluminate, which solutions may be processed to precipitate cryolite. U.S. Pat. No. 3,106,448 teaches reaction between fluoride values in spent liners and a water soluble carbonate to produce water soluble sodium fluoride which may in turn be precipitated with sodium aluminate to form cryolite. In addition, the extraction and recovery of alumina and fluoride values with dilute ammonia solutions is known.

One of the more recent methods for recovery of fluoride and aluminium values involves the pyrohydrolysis of the carbonaceous material, preferably in a fluidised bed reactor. Pyrohydrolysis involves contacting the spent cathode and/or cell lining with water or steam at high temperatures, whereby the water introduced reacts with the fluoride compounds to form HF. However, it has been found that while the pyrohydrolysis of aluminium fluoride is relatively easy, calcium fluoride and, particularly, sodium fluoride are more difficult to react. U.S. Pats. No. 4,113,832, 4,158,701, 4,160,808, and 4,160,809 all relate to pyrohydrolysis techniques for the recovery of fluoride values from spent cell linings.

However, the processes described in the aforementioned patents require exceptionally high temperatures and excessive quantities of steam.

In a more recent patent to Martin Marietta Corporation (U.S. 4,355,017) there is described a pyrosulpholysis procedure for the treatment of carbon cathodes waste material which involves high temperature treatment with air, stream and sulphur dioxide in a single reactor. The reactor may be a fluidised bed, packed bed or closed furnace.

The recovery process involves the following reactions in the waste material

Decomposition of cyanides

Combustion of the carbonaceous and hydrocarbon material

Oxidation of sulphides and nitrides

Sulpholysis of the fluoride salts thereby forming HF gas and sulphate salts

A major disadvantage of using a single reactor is that all reactions take place in the one reactor with the reactants necessarily present in low concentrations which is not conducive to high reaction efficiency. The conversion of sulphur containing reactants particularly tends to create emissions which constitute environmental hazards in addition to those caused by fluorides and cyanides. The variable chemical composition of the feed stocks makes control even more difficult in a single reactor.

By conducting sulpholysis in a separate stage the present invention enables the concentration of the gaseous fluoride species to be increased to the maximum extent possible, thereby facilitating their recovery and reducing the magnitude of the gas handling equipment which is required for a given amount of fluoride recovered.

Recovery of hydrofluoric acid for subsequent production of aluminium fluoride or cryolite or other fluoride chemicals is simpler and more economic from a concentrated rather than a dilute stream. A further advantage of increased hydrofluoric levels in the sulpholysis offgas is gained by the possible use of more highly oxidised forms of the sulphur containing reactants. The improvements in hydrofluoric acid offgas levels through these changes in reactors and sulphur-containing feed materials are demonstrated in the following table.

Estimates of Maximum Possible Hydrofluoric Acid Concentration in the Offgas Streams for Various Process Approaches for Pyrosulpholysis

| PROCESS APPROACH | SULPHUR SOURCE | HF PARTIAL PRESSURE, ATM. |
|---|---|---|
| 1. Combined Combustion and Sulpholysis | Elemental Sulphur | 0.039 |
| 2. Combined Combustion and Sulpholysis | Sulphur Dioxide | 0.047 |
| 3. Combined Combustion and Sulpholysis | Sulphur Trioxide or Sulphuric Acid | 0.052 |
| 4. Separate Sulpholysis | Elemental Sulphur | 0.127 |
| 5. Separate Sulpholysis | Sulphur Dioxide | 0.274 |
| 6. Separate Sulpholysis | Sulphur Trioxide or Sulphuric Acid | 0.656 |

Assumption Used in Theoretical Mass Balances:
A. Excess Oxygen for Carbon Combustion of 10%:
B. Excess Oxygen for Oxidation of Sulphur or Sulphur Dioxide to Sulphur Trioxide of 100%
C. Excess Steam for Sulpholysis of 100%.
D. Excess Sulphur, Sulphur Dioxide or Sulphur Trioxide for Sulpholysis of 5%.

A further important advantage of the multi or two stage process of the invention is the facility of being able to carry out the combustion stage independently of the remainder. This stage could, for instance, be carried out at separate smelters in different locations and the product ash could be shipped to a single site for fluoride recovery. It must be emphasised that such ash will be environmentally less hazardous in transport because its contained cyanides, sulphides and nitrides will have been decomposed beforehand.

Prior to the combustion stage or between the separate combustion and sulpholysis stages, further advantage may be gained through the use of mineral beneficiation procedures aimed at separation of oxides, such as alpha alumina, beta alumina and silica, from the fluoride containing materials, such as cryolite, sodium fluoride, aluminium fluoride and calcium fluoride. The procedures may include one or more of such operations as crushing, grinding, density separation, size separation etc. Beneficiation may also be achieved chemically. The ash may thus be treated with an aqueous lime slurry to convert fluoride values to an insoluble fluoride phase that can be separated from the remaining ash. Alternatively fluoride can be leached from the ash with a dilute caustic solution. Lime may then be added to the fluoride rich liquor to precipitate calcium fluoride. These operations will lead to a higher concentration of fluorides in the feed to the sulpholysis reactor, improved reaction efficiency through reduced possibility of a side reaction of sulphuric acid with alpha and beta alumina, and improved reaction efficiency owing to a reduced possibility of reaction of HF with silica to form silicon tetrafluoride and fluorosilicic acid.

Overall separate reactors and separate control for each stage enable maximum optimisation of each stage of the process, something which is not possible in a single rector.

Figure 2:
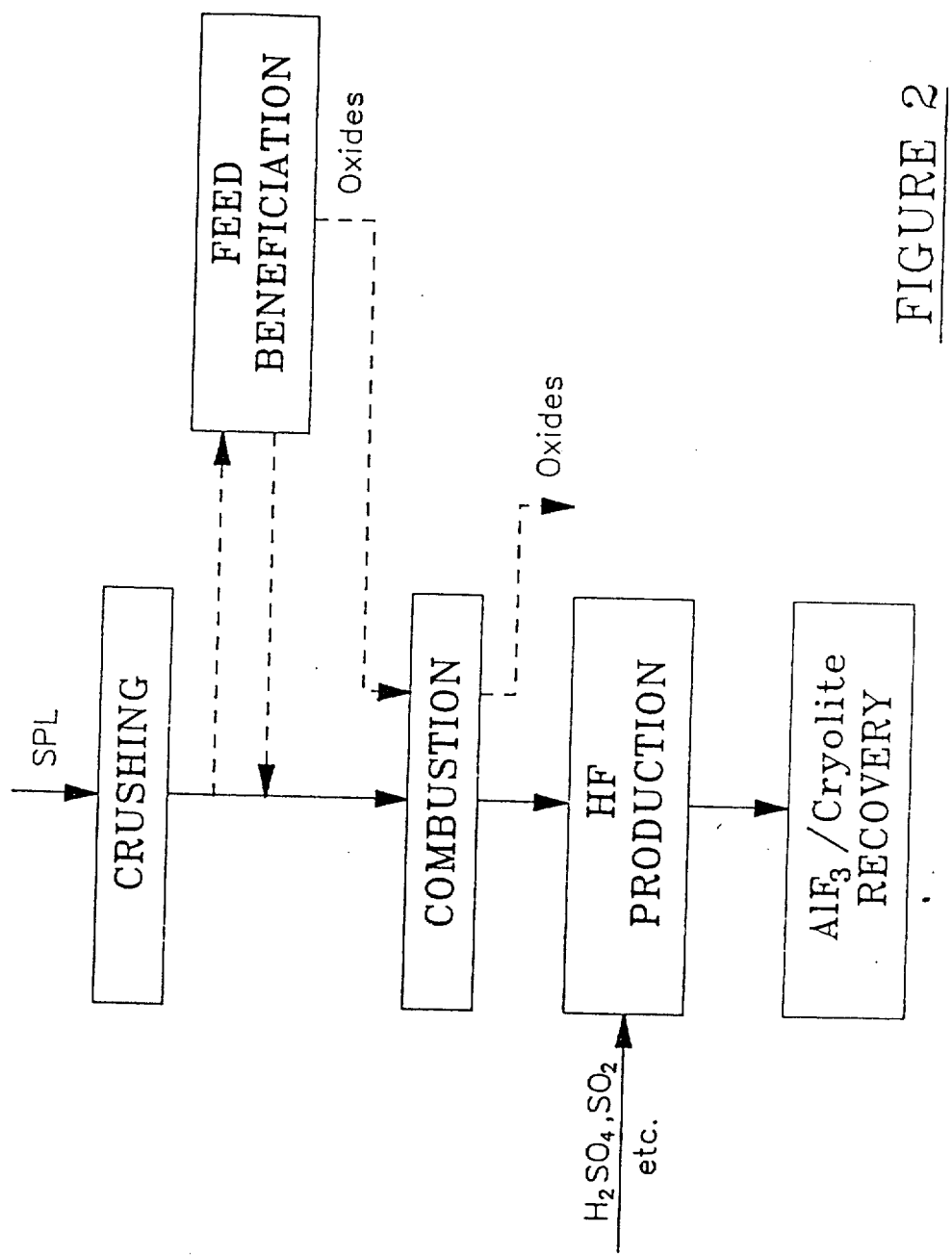

The accompanying FIGS. 1 and 2 are flowsheets for preferred aspects of the invention.

In this preferred embodiment, spent potlining (SPL) is first crushed and screened to the desired size fraction and then beneficiated and/or fed directly to the combustion unit. A number of reactions proceed concurrently, including the oxidation of carbon, aluminium metal, dross and carbide, destruction of cyanide and elimination of nitrides, sulphides and acetylene. The oxidation reactions are highly exothermic in nature.

It is desirable to control the combustion temperature within the range 700°-875° C., for the following reasons
  Below 700° C., unacceptably low rates of carbon combustion and cyanide destruction are experienced.
  Above 875° C. agglomeration may occur, owing to the presence of low melting point salts in SPL. Agglomeration can result in catastrophic reactor shutdown or, in less severe cases, restricted carbon combustion through the formation of a non-permeable coating around individual SPL particles.

Temperature may best be controlled through the control of SPL and air addition rates. As a further aid to the control of SPL agglomeration, certain inert additives, such as kaolin clay, have been found to be effective at moderate levels. The use of such additives is known.

A number of different reactor devices may be suitable for the combustion of SPL, including
  (i) Rotary kiln,
  (ii) Circulating fluid bed,
  (iii) Fluidized bed,
  (iv) Multiple hearth incinerator,
  (v) Moving grate furnace,
  (vi) Open hearth furnace,
  (vii) Torbed reactor.

Each reactor type has specific advantages and disadvantages; the preferred combustor type in a given case will be that best equipped to handle the agglomerating tendency of SPL, which will be reflected in its ability to control combustion temperature.

The solid product resulting from the combustion treatment of SPL is a mixture principally of oxide and fluoride salts resulting from both the original materials of cathode construction, as well as materials absorbed into the cathode structure during the operation of the cell. Depending on the exact design of the cathode, details of its operating experience and life and possible other factors, the exact chemical composition of the SPL, as well as that of the ash product resulting from the combustion of SPL can vary over a very broad range. Typically any or all of the following materials may be present

| Fluorides: | Cryolite | $Na_3AlF_6$ |
|---|---|---|
| | Chiolite | $Na_5Al_3F_{14}$ |
| | Aluminium Fluoride | $AlF_3$ |
| | Sodium Fluoride | $NaF$ |
| | Calcium Fluoride | $CaF_2$ |
| | Lithium Fluoride | $LiF$ |
| | Magnesium Fluoride | $MgF_2$ |
| | Various Mixed Fluorides | |
| Oxides: | α- Alumina | $Al_2O_3$ |
| | β- Alumina | $Na_2O.(Al_2O_3)$ |
| | Silica | $SiO_2$ |
| | Various silica aluminates, sodium silicates and sodium aluminium silicates. | |

In certain instances, an advantage may be gained through the use of pretreatments prior to direct sulpholysis treatment. The purpose of such pretreatments is a separation of the fluoride and oxide constituents so as to produce a feed stock of upgraded fluoride content. Such pretreatments may include the steps of particle size reduction by grinding and crushing, and either physical separation usually on the basis of differences in densities of the various phases, or chemical treatment. Pretreatment to a feedstock of upgraded fluoride content has the advantages of a reduced mass of material needing to be treated for a given amount of fluoride to be recovered and of less chance of wasteful side reactions with oxides.

The SPL ash and/or fluoride upgraded feed is then subjected to sulpholysis treatment for the liberation of hydrofluoric acid vapour. Sulpholysis treatment involves the treatment of fluoride containing feed with chemical feedstocks capable of producing sulphuric acid to achieve chemical reactions of the general form below

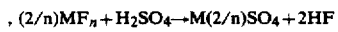

$$, (2/n)MF_n + H_2SO_4 \rightarrow M(2/n)SO_4 + 2HF$$

where M=metal.

Reactions are carried out at elevated temperatures in the range of 120° C. to 900° C. The preferred range of temperature is dependent on the nature of the fluoride bearing species. In the case of feeds containing alumina, the preferred range of temperature is between 770° to 870° C. at which temperatures aluminium sulphates are known to decompose above which certain bath constituents become molten. Furnace reactors including the following may be used.
  Rotary Kiln
  Hirschoff furnace
  Rotary hearth furnace Fluid bed reactor
Circulating fluid bed reactor
Torbed reactor
Commonly used feed stocks for producing sulphuric acid include
  Concentrated sulphuric acid
  Dilute aqueous solutions of sulphuric acid
  Mixtures of concentrated sulphuric acid and sulphur trioxide (Oleum)
  Mixtures of sulphur trioxide (oleum) and steam
  Mixtures of sulphur dioxide, ai and steam
  Mixtures of elemental sulphur, air and steam The relative proportions of the components of the above described mixtures are selected for the optimal degree of sulphuric acid equivalent.

The calculated values presented in the following Table 1 illustrate the advantages gained by two-stage treatment over the single stage treatment in which combustion and sulpholysis are carried out in one reactor. As stated, a very significant advantage of two-stage treatment is that the total volume of gaseous material is reduced while the concentration of HF in that volume is increased. Further advantages in reducing total gaseous volume and increasing HF concentration are achieved in choosing more highly oxidized forms of sulphur as feedstock for the sulpholysis reaction. In essence, the use of the more oxidized forms reduces the need for reactant oxygen and minimises the diluting effect of nitrogen co-present with oxygen in air. Dilution with nitrogen could be eliminated altogether through the use of pure oxygen with the less oxidized forms of sulphur feedstocks, however, at some cost penalty to the process.

TABLE 1
ESTIMATED OFFGAS FLOWRATES AND HF PARTIAL PRESSURES FOR VARIOUS PYROLSULPHOLYIS OPTIONS*

| Process | Sulphur Source | Exit Gas kg moles/hr | HF Partial/Pressure (atm) |
| --- | --- | --- | --- |
| Combustion & Sulpholysis | Sulphur | 218 | 0.038 |
| Combustion & Sulpholysis | Sulphur Dioxide | 183 | 0.045 |
| Combustion & Sulpholysis | Sulphur Trioxide | 166 | 0.050 |
| Combustion | — | 153 | — |
| Sulpholysis | Sulphur | 65 | 0.127 |
| Combustion | Sulphur | | |
| Sulpholysis | Dioxide | 30 | 0.275 |
| Combustion | Sulphur | | |
| Sulpholysis | Trioxide | 13 | 0.656 |

*Basis : 1 tonne SPL/hr

Preferred aspects of the invention will be further illustrated by the following non-limiting examples, in which Examples 1 and 2 relate to combustion and Examples 3 and 4 relate to sulpholysis.

EXAMPLE 1

A 1kg sample of SPL was crushed and screened to less than 300 microns, and used as feedstock to a laboratory scale rotary kiln. The following test conditions applied:
  Kiln Set Point Temperature : 750° C.
  Air Flowrate : 30 l/min.
  Solids Residence Time : 30 min.
  Kiln Rotation Rate : 8 to 10 rpm
  Solids Feed Rate : 10 to 15 gm/min.

The thermal response of the kiln was closely monitored with time, and is shown in Table 2. No evidence of SPL agglomeration was detected, with a total of 660 g of ash recovered. The sample of SPL ash was subsequently analyzed, with pertinent results shown in Table 3. High levels of cyanide destruction and carbon combustion were achieved under these conditions.

TABLE 2
THERMAL RESPONSE OF ROTARY KILN - EXAMPLE A
Kiln Air Flow Rate 50 l/min.

| Time (Minutes) | Temperature |
| --- | --- |
| T = 0 | 750° C. |
| 25 | 775° C. |
| 50 | 787° C. |
| 75 | 790° C. |
| 100 | 800° C. |
| 125* | 820° C. |
| 150 | 810° C. |

*Feed Addition Stopped.

TABLE 3
SPL ASH EX ROTARY KILN

| Species | SPL Ash Ex Kiln (wt %) | SPL Feedstock (wt %) |
| --- | --- | --- |
| C | 1.7 | 18.7 |
| % S | 0.17 | 0.24 |
| % Si | 1.40 | 1.12 |
| % Na | 10.0 | — |
| % Ca | 1.45 | — |
| % Fe | 1.21 | — |
| % Al | 26.1 | — |
| CN⁻(ppm) | <5* | 860 |
| % F | 14.1 | 12 |

*Limit of analytical procedure.

EXAMPLE 2

A further sample of SPL, taken from a different location, was crushed and screened to −300 micron, and fed to the rotary kiln. Kiln conditions were identical to those used in Example 1. In this case a strong exotherm was observed, with the kiln temperature rising to >900° C. Severe agglomeration resulted, with the material forming pellets up to 5mm in diameter. The exotherm was subsequently moderated by reducing air flowrate to the kilm.

A temperature profile for this experiment is shown in Table 4 and is in contrast to that obtained in Example 1. In addition to carbon combustion, other oxidation reactions apparently contribute to the extremely exothermic nature of this material. As mentioned previously this may be related to the relative amounts of aluminum metal, dross or carbide in this sample.

TABLE 4
THERMAL RESPONSE OF ROTARY KILN - EXAMPLE 2

| Time (minutes) | Temperature (°C.) | Kiln Air Flow Rate (l/min) |
| --- | --- | --- |
| T = 0 | 750 | 50 |
| 25 | 975 | 30 |
| 50 | 910 | 30 |
| 75 | 890 | 30 |
| 100 | 880 | 0 |
| 125* | 825 | 0 |
| 150 | 785 | 0 |

*Feed Addition Stopped.

As illustrated in the following Examples 3 and 4, the reaction between ash from combustion treatment of SPL and sulphuric acid has been studied in several fashions. Certain of these experiments have involved low temperature processing of ash and acid prior to thermal treatment, and others have involved direct addition of acid and ash to a high temperature reactor. Details of both types of experiments are described in the following Examples 3 and 4.

EXAMPLE 3 (Pre-mixing)

Concentrated sulphuric acid (98% $H_2SO_4$) and ash obtained in Example 1 were added to a "Heligear" mixer prior to any thermal treatment. The first experiment involved an estimated stoichiometric addition of acid while the second involved an amount of acid estimated as four times stoichiometric. In the first experiment, acid was added to the mixer in increments of 40ml at intervals of about 15 minutes. In the second, increments of 50ml were added in intervals of 5 to 15 minutes. Details of both experiments are outlined in Table 5.

TABLE 5

| EXPERIMENTAL DETAILS | | |
|---|---|---|
| Experiment | 1 | 2 |
| Mass of Ash, g | 600 | 970 |
| Assumed Fluoride Content of Ash, Wt % | 13.6 | 13.6 |
| Volume of Acid Added, $cm^3$ | 120 | 750 |
| Mass of Acid Added, g | 216 | 1350 |
| Total Weight Added, g | 816 | 2320 |
| Total Weight Recovered from Mixer, g | 751 | 1114 |
| Weight Loss, g | 65 | 1206 |
| Weight Loss, % | 8 | 52 |

In both experiments the mixer was externally heated to a temperature of about 200° C. prior to acid addition. When acid was added there was a copious liberation of heat with fume evolution. Glass sight ports on the mixer body were heavily etched by the fume indicating that a portion of the fume contained hydrofluoric acid. The remainder of the fume probably consisted of sulphuric acid vapour, sulphur trioxide and water, none of which are known to etch glass. When added to the ash, the acid initially lead to the formation of sticky lumps, with a consistency similar to wet beach sand. With continued mixing these broke down into fairly free-flowing powder. In addition to the fume as a principal cause of weight loss, an additional factor was the stickage of a portion of the solids to the walls and blades of the mixer.

Although a portion of the fluorides were apparently released during the low temperature premixing, as evidenced by the etching of the glass sight port, more complete reaction was achieved by thermal treatment of the premixed solids in a rotary kiln operating at a temperature of 800° C. Chemical analyses of kiln feed and products are shown in Table 6.

TABLE 6

| ACID TREATMENT OF SPL ASH | |
|---|---|
| Material | Wt % F |
| Feedstock (SPL Ash) | 14.1 |
| Stoichiometric (× 1) | |
| Premixer product | 9.0 |
| Kiln product | 2.0 |
| Stoichiometric (× 4) | |
| Premixer product | 0.9 |
| Kiln product | 0.6 |

EXAMPLE 4 (Direct Addition)

SPL combustion ash from Example 1 and concentrated sulphuric acid were fed directly to a laboratory sized, externally heated rotary kiln. The kiln was heated to a temperature of 800° C. prior to the addition of acids and solids. Solids were fed to the kiln from a hopper using a screw feeder. Solids feed rates were in the rate of 10 to 15 g/min. Sulphuric acid was fed to the kiln with a peristaltic pump. When near stoichiometric levels of acid were added with the solids, a very pasty mixture which adhered to the kiln wall resulted. This problem could be lessened by multiple passes of solids through the kiln using acid additions of less than estimated stoichiometric requirements in any one of the passes. Results of experiments performed on this basis are reported in Table 7.

TABLE 7

| ACID TREATMENT OF SPL ASH | | | |
|---|---|---|---|
| Pass No. | F (wt %) | Acid Added ($cm^3$, cumulative) | % Stoichiometric Requirement |
| SPL Ash | 14.1 | — | — |
| 1 | 13.7 | 14 | 13 |
| 2 | 12.0 | 46 | 41 |
| 3 | 9.1 | 75 | 91 |
| 4 | 8.3 | 82 | 100 |
| 5 | 6.9 | 105 | 128 |
| 6 | 3.9 | 105 | 128 |

It will be clearly understood that the invention in its general aspects is not limited to the specific details referred to hereinabove.

We claim:

1. Process for recovery of fluoride values from material containing fluoride salts together with combustible components, said process comprising combustion of the said components and sulpholysis of the fluoride salts, characterized in that the material is subjected to combustion in a first step, and the combustion product is subjected to sulpholysis in a separate step, without an intermediate leaching step, wherein the sulpholysis produces a gaseous product containing fluoride values.

2. Process according to claim 1 in which the combustion step is carried out at temperatures in the range 700° to 870° C. and the sulpholysis is carried out at temperatures in the range 120 to 900° C.

3. Process according to claim 2 in which the sulpholysis is carried out at temperatures in the range 770 to 870° C.

4. Process according to claim 1 in which the sulpholysis is carried out using a chemical feedstock chosen from the group consisting of concentrated sulphuric acid; dilute aqueous solutions of sulphuric acid; mixtures of concentrated sulphuric acid and sulphur trioxide; mixtures of sulphur trioxide and steam; mixtures of sulphur dioxide, air and steam; mixtures of elemental sulphur, air and steam.

5. Process according to claim 1 characterized in that the material is crushed and screened to a size fraction suitable for combustion and fed to a combustion reactor in which the material is subjected to oxidation at temperatures in the range 700° to 875° C. to produce an SPL ash, and the SPL ash is subjected to sulpholysis in a separate reactor at temperatures in the range 120° to 900° C. to produce a gaseous product containing fluoride values.

6. Process according to claim 5 in which the sulpholysis is carried out at temperatures in the range 770° to 870° C.

7. Process according to claim 5 in which the sulpholysis is carried out using a chemical feedstock chosen from the group consisting of concentrated sulphuric acid; dilute aqueous solutions of sulphuric acid; mixtures of concentrated sulphuric acid and sulphur trioxide; mixtures of sulphur trioxide and steam; mixtures of sulphur dioxide, air and steam; mixtures of elemental sulphur, air and steam.

8. A process for recovery of fluoride values from material containing fluoride salts together with combustible components, said process consisting essentially of the steps of:
   combustion of said components resulting in a combusted material, and
   sulpholysis of the combusted material wherein the sulpholysis produces a gaseous product containing fluoride values.

9. The process according to claim 8 in which the combustion step is carried out at temperatures in the range 700° to 875° C. and the sulpholysis is carried out at temperatures in the range 120° to 900° C.

10. The process according to claim 9 in which the sulpholysis is carried out at temperatures in the range 770° to 870° C.

11. The process according to claim 8 in which the sulpholysis is carried out using a chemical feedstock chosen from the group consisting of concentrated sulphuric acid; dilute aqueous solutions of sulphuric acid; mixtures of concentrated sulphuric acid and sulphur trioxide; mixtures of sulphur trioxide and steam; mixtures of sulphur dioxide, air and steam; mixtures of elemental sulphur, air and steam.

12. A process for recovery of fluoride values from material containing fluoride salts together with combustible components, said process consisting of the steps of:
   combustion of said components resulting in a combusted material, and
   sulpholysis of the combusted material wherein the sulpholysis produces a gaseous product containing fluoride values.

13. The process according to claim 12 in which the combustion step is carried out at temperatures in the range 700° to 875° C. and the sulpholysis is carried out at temperatures in the range 120° to 900° C.

14. The process according to claim 13 in which the sulpholysis is carried out at temperatures in the range 770° C. to 870° C.

15. The process according to claim 13 in which the sulpholysis is carried out using a chemical feedstock chosen from the group consisting of concentrated sulphuric acid; dilute aqueous solutions of sulphuric acid; mixtures of concentrated sulphuric acid and sulphur trioxide; mixtures of sulphur trioxide and steam; mixtures of sulphur dioxide, air and steam; mixtures of elemental sulphur, air and steam.

* * * * *